United States Patent
Cullmann et al.

(10) Patent No.: US 12,286,014 B2
(45) Date of Patent: Apr. 29, 2025

(54) METHOD FOR DISPLAYING A STATE OF A VOICE ASSISTANCE SYSTEM, VOICE ASSISTANCE SYSTEM, AND MOTOR VEHICLE

(71) Applicant: Volkswagen Aktiengesellschaft, Wolfsburg (DE)

(72) Inventors: Jacqueline Cullmann, Braunschweig (DE); Julia Schettler, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 66 days.

(21) Appl. No.: 18/557,245

(22) PCT Filed: Apr. 25, 2022

(86) PCT No.: PCT/EP2022/060796
§ 371 (c)(1),
(2) Date: Oct. 25, 2023

(87) PCT Pub. No.: WO2022/242986
PCT Pub. Date: Nov. 24, 2022

(65) Prior Publication Data
US 2024/0208331 A1    Jun. 27, 2024

(30) Foreign Application Priority Data
May 17, 2021   (DE) .......................... 102021204944.3

(51) Int. Cl.
*B60K 35/28*   (2024.01)
*B60K 35/10*   (2024.01)
(Continued)

(52) U.S. Cl.
CPC .............. *B60K 35/28* (2024.01); *B60K 35/10* (2024.01); *B60K 35/22* (2024.01); *B60K 35/265* (2024.01);
(Continued)

(58) Field of Classification Search
CPC ........ B60K 35/28; B60K 35/10; B60K 35/22; B60K 35/265; B60K 2360/148; B60K 2360/162; B60K 2360/338
See application file for complete search history.

(56) References Cited

U.S. PATENT DOCUMENTS 9,230,559 B2 *   1/2016   Yoon ................ H04N 21/42203
9,678,339 B2 *   6/2017   Macquet ............ G02B 27/0101
(Continued)

FOREIGN PATENT DOCUMENTS

DE    102011121110 A1    6/2013
DE    102017206876 A1 *  10/2018  ......... B60R 16/0373
(Continued)

OTHER PUBLICATIONS

PCT/EP2022/060796. International Search Report (Aug. 10, 2022).
Priority German Application No. 102021204944.3. Examination Report (Jan. 26, 2022).

*Primary Examiner* — Chico A Foxx
(74) *Attorney, Agent, or Firm* — Peter Zura; LOZA & LOZA, LLP

(57) ABSTRACT

Technologies and techniques for displaying a specific state of a voice assistance system for performing a voice assistance function for a motor vehicle. A light strip is provided for providing a specific light distribution, wherein a specific light characteristic of the light strip is associated with the specific state of the voice assistance system, wherein, when the voice assistance system exhibits the specific state, the light strip displays the specific light distribution according to the associated light characteristic, wherein a specific feedback display is associated with the specific state of the voice assistance system, and, when the voice assistance system exhibits the specific state, the specific feedback display is additionally displayed on a display device that is distinct from the light strip.

20 Claims, 4 Drawing Sheets

(51) Int. Cl.
*B60K 35/22* (2024.01)
*B60K 35/26* (2024.01)

(52) U.S. Cl.
CPC .. *B60K 2360/148* (2024.01); *B60K 2360/162* (2024.01); *B60K 2360/338* (2024.01)

(56) References Cited

U.S. PATENT DOCUMENTS

| | | | |
|---|---|---|---|
| 11,037,556 B2* | 6/2021 | Rangarajan | G06F 3/167 |
| 2004/0239526 A1* | 12/2004 | Nakajima | G08G 1/096775 |
| | | | 340/905 |
| 2005/0128106 A1* | 6/2005 | Nakaishi | G01C 21/3629 |
| | | | 340/988 |
| 2020/0027452 A1* | 1/2020 | Rangarajan | G06F 3/167 |
| 2021/0082395 A1* | 3/2021 | Albl | G10L 13/08 |
| 2023/0012342 A1* | 1/2023 | Zhao | G06F 3/165 |
| 2024/0208331 A1* | 6/2024 | Cullmann | B60K 35/23 |

FOREIGN PATENT DOCUMENTS

| | | | |
|---|---|---|---|
| DE | 102019119171 A1 | 1/2020 | |
| DE | 102019204541 A1 * | 10/2020 | |
| DE | 102014018423 B4 | 3/2021 | |
| DE | 102017206876 B4 | 12/2021 | |
| EP | 3388286 A1 | 10/2018 | |
| EP | 3388286 B1 * | 12/2019 | ............ B60K 35/00 |
| KR | 20190016925 A | 2/2019 | |

* cited by examiner

METHOD FOR DISPLAYING A STATE OF A VOICE ASSISTANCE SYSTEM, VOICE ASSISTANCE SYSTEM, AND MOTOR VEHICLE

RELATED APPLICATIONS

The present application claims priority to International Patent Application No. PCT/EP2022/060796 to Cullman, et al., filed Apr. 25, 2022, titled "Method For Displaying A State Of A Voice Assistance System, Voice Assistance System, And Motor Vehicle," which claims priority to German Pat. App. No. 10 2021 204 944.3 filed May 17, 2021, to Cullman, et al., the contents of each being incorporated by reference in their entirety herein.

TECHNICAL FIELD

The present disclosure relates to technologies and techniques for displaying a specific state of a voice assistance system for a motor vehicle. The present disclosure also relates to a voice assistance system and a motor vehicle with such a voice assistance system.

BACKGROUND

Various voice assistance systems are known in the prior art. Examples include Siri, Alexa, and, particularly in the automotive field, IDA, an intelligent driving assistant. Such voice assistance systems are typically designed to receive voice commands from a user, perform tasks depending on the respective commands received, and output information about the results. In the case of the Alexa or Siri voice assistants, for example, it is also common to signal to the user that the voice assistant is ready to receive voice input by means of a light ring or a corresponding indicator on a mobile phone display. This readiness can also be indicated by acoustic signals. This readiness can also be indicated by acoustic signals. Such voice assistance functions can also be used in the automotive sector, e.g., to provide the driver of a motor vehicle or a front passenger with appropriate support, e.g., to find gas stations or restaurants along a planned route, to make a phone call, to request technical information about the motor vehicle or the like. However, for motor vehicle applications in particular, such a voice assistance system must meet other or additional requirements. It should distract the driver as little as possible from what is happening on the road. In addition, it should be possible to indicate to the driver, for example, the current readiness to receive voice commands or other states of the voice assistance system in an easily perceptible manner without distracting the driver from the driving situation.

SUMMARY

Aspects of the present disclosure are directed to a method, a voice assistance system, and a motor vehicle which make it possible to provide a user with a state of a voice assistance system in a manner which is as simple as possible to differentiate, and easy to recognize.

Some aspects are disclosed in the method, voice assistance system, and motor vehicle having the features according to the respective independent claims. Advantageous embodiments of the invention are the subject matter of the dependent patent claims, the description, and the figures.

In some examples, a method is disclosed for displaying a specific state of a voice assistance system for performing a voice assistance function for a motor vehicle. A light band is provided that is configured to provide a specific light distribution along the light band, wherein a specific light characteristic of the light band is assigned to the specific state of the voice assistance system, and wherein, when the voice assistance system has the specific state, the light band displays the specific light distribution according to the assigned light characteristic. Further, a specific feedback representation is assigned to the specific state of the voice assistance system, and when the voice assistance system is in the specific state, the specific feedback representation is additionally displayed on a display device other than a light band.

In some examples, a voice assistance system for a motor vehicle is disclosed for providing a voice assistance function and for displaying a specific state of the voice assistance system, wherein the voice assistance system comprises a control device. The voice assistance system comprises a light band, that is configured to provide a specific light distribution along the light band, wherein the control device is configured to assign a specific light characteristic of the light band and a specific feedback representation to the specific state of the voice assistance system. In this context, the control device is further designed, when the voice assistance system is in the specific state, to control the light band in such a way that said light band displays the specific light distribution in accordance with the assigned light characteristic, and to control a display device other than the light band in such a way that said display device displays the specific feedback representation.

Advantages described for the method according to the present disclosure and its embodiments apply in the same way to the voice assistance system.

Furthermore, the present disclosure also relates to a motor vehicle with a voice assistance system according to some aspects.

The present disclosure also relates to further embodiments of the voice assistance system, which have features as already described in connection with the further embodiments of the method. For this reason, the corresponding further embodiments of the voice assistance system according to the present disclosure will not be described again here.

The present disclosure also includes the combinations of features of the described embodiments.

DESCRIPTION OF THE DRAWINGS

Exemplary embodiments of the present disclosure are described below. The following figures show.

DETAILED DESCRIPTION

Figure 1:
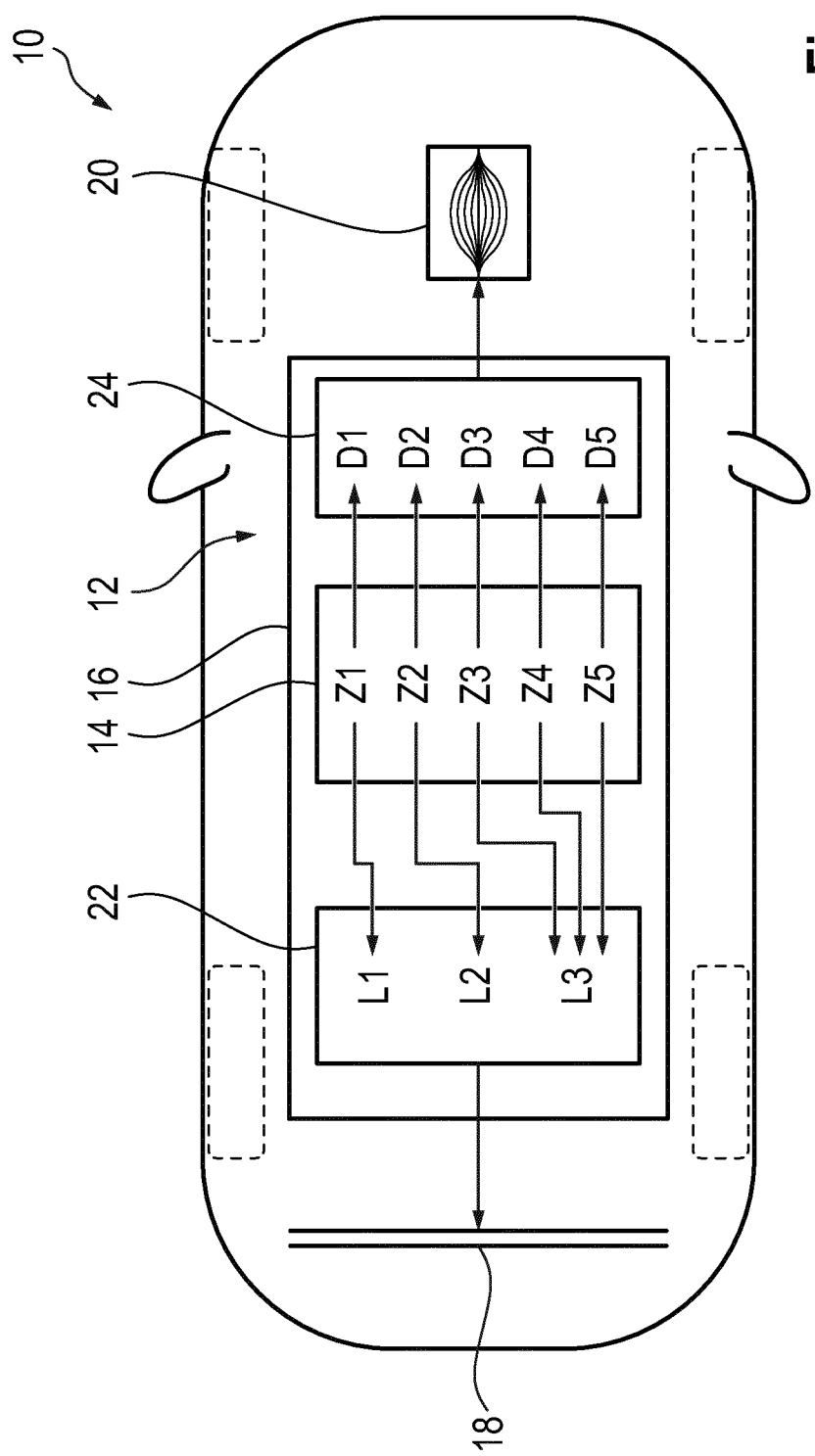
FIG. 1 illustrates a schematic representation of a motor vehicle with a voice assistance system according to some aspects of the present disclosure.

The exemplary embodiments explained below are the preferred exemplary embodiments of the invention. In the exemplary embodiments, the components described each represent individual features of the invention to be considered independently of one another, each of which also develops the invention independently of the others and all of which are therefore also to be regarded as part of the invention individually or in a combination other than that shown. Furthermore, the exemplary embodiments described can also be supplemented by further features of the invention that have already been described.

Elements with the same function are each provided with the same marks of reference in the figures.

In the examples provided herein, a light band, which can also be referred to as an ID light, may be utilized to communicate the specific state of the voice assistance system to a user in a simple and comprehensible manner without requiring a large installation space, in principle at any desired location in the motor vehicle. Such a light band can be provided in an extremely small installation space, and can run virtually like a ribbon through parts of the interior of the motor vehicle, making it easy to place it anywhere in the motor vehicle. In this context, it is advantageous if at least a part of such a light band is arranged in such a way that it is located in the field of vision or at least in the peripheral field of vision of a driver and/or front passenger of the motor vehicle. Such a light band can, for example, be provided as an LED band with a few, for example one or two LED rows.

The output of the state of the voice assistance system via a specific light characteristic of such a light band is particularly advantageous, since a user can thereby be provided with a visualization of the specific state of the voice assistance system which is particularly easy to understand and uniform and, above all, easy to perceive from the periphery, in particular without the driver having to take his eyes off the road. The driver does not have to concentrate on a display, for example, but rather perceives the specific state of the voice assistance system in a very subtle and less distracting way through the light characteristic of the light band in the periphery of his field of vision. In other words, the state of the voice assistance system can be communicated to the user in a particularly easy to understand but at the same time particularly less distracting manner.

However, one particular advantage is that the specific state of the voice assistance system is not only visualized by the specific light distribution according to the light characteristic of the light band, but also by an associated feedback representation on another display device, such as a motor vehicle. On the one hand, this makes it possible to display and thus differentiate significantly more states of a voice assistance system in different ways, since not only the differentiation possibilities of the light band can be used, but also the additional differentiation possibilities through specific feedback representations on a display device. In addition, this has the great advantage that through this additional feedback representation an even more differentiated and comprehensible display of a specific state of the voice assistance system can be provided to a user, if required.

For example, the light band can roughly convey the active or inactive states to the user in a very subtle and less distracting way, while an even more differentiated display of different active states can be provided, for example, by a corresponding feedback representation on the display device. If the user is, for example, the driver of the motor vehicle, he will always be informed by the light band at least about rough current states of the voice assistance system, even if he cannot avert his gaze from the road at the moment, while he can decide for himself whether he can avert his gaze from the road at the moment in order to receive further details or a more detailed differentiation of the current state of the voice assistance system from the display device via the associated feedback representation. A front passenger, on the other hand, can be provided with a very differentiated display of the current state of the voice assistance system at any time, which is very advantageous because a front passenger can also use such a voice assistance function or the voice assistance system of the motor vehicle. By combining a plurality of display media, it is thus advantageously possible to provide a user with particularly differentiated and situationally adapted information about a current state of the voice assistance system.

As already described, the light band can be provided by one or at least a few LED rows. Preferably, it is arranged at least for the most part in a front area of a motor vehicle, in particular in the interior of the motor vehicle, for example below a windshield of the motor vehicle. Due to its narrow design, the light band can be understood as a one-dimensional display device, so to speak. On the other hand, the display device for displaying at least the specific feedback representation is preferably at least a two-dimensional or also a three-dimensional display device, in particular of the motor vehicle. Such a display device may, for example, be in the form of a display such as an LED display, LCD display, OLED display or head-up display. Preferably, the display device is a center display in the motor vehicle and/or a display in the instrument cluster of the motor vehicle and/or a head-up display assigned to the driver's area. However, a plurality of such display devices in the motor vehicle can also be used to represent the feedback representation. In particular, the choice of display device may also depend on other factors, which will be explained in more detail below.

In this context, the voice assistance system may be associated with a motor vehicle. Such a voice assistance system may be designed to perform a voice assistance function, such as performing tasks depending on a received voice command from a user. Such tasks may be related to the motor vehicle and/or related to motor vehicle functions and/or independent of motor vehicle functions.

In this respect, it is particularly advantageous in particular if the voice assistance system comprises a plurality of different states including the specific state, each of the different states being assigned to a respective light characteristic of the light band and a specific feedback representation, such that two different states do not have both the same light characteristic and the same specific feedback representation associated therewith. In other words, two different states preferably differ in at least one of the feedback representations and the light characteristic. Thus, different states can be advantageously distinguished from each other. In this context, the type of representation can also contribute to making it intuitively understandable to the user in which state the voice assistance system is currently located. The specific state displayed is preferably a current state of the voice assistance system. In other words, the respective current state of the voice assistance system can thus be displayed to a user.

In some examples, the specific state represents at least one of the following states assigned to the voice assistance system: a listening state, in which the voice assistance system is prepared for receiving a voice input from a user; a processing state, in which the voice assistance system receives a voice input and/or processes a received voice input and/or performs a task specified by the voice input; a speaking state, in which the voice assistance system outputs information to a user, in particular acoustically; and a pausing state, in which the voice assistance system is prepared for receiving a defined wake-up signal but not for receiving a voice input other than the wake-up signal. For example, in the pausing state, the voice assistance system may be transitioned to another state, such as the listening state, by receiving such a defined wake-up signal. Thus, the pausing state may be a kind of idle state, sleep state, or standby mode, respectively. For example, a defined wake-up signal may be a voice signal, such as speaking a specific signal word, such as "IDA." However, a defined wake-up signal can also be provided in another way, e.g., by pressing a specific control element assigned to the voice assistance system, e.g., a button or the like.

Optionally, even more different states can be defined. In addition, these states can also be divided into sub-states. For example, the processing state can be subdivided into further sub-states, depending on what is currently being processed by the voice assistance system. However, even with these four different states, a user is advantageously already comprehensively informed about the status of the voice assistance system and, by displaying this current state, advantageously receives feedback as to whether or not his request has been recognized by the voice assistance system, whether the voice assistance system is still in the process of evaluating his request or whether there are problems with the execution of a task or whether the voice assistance system could not be woken up by the wake-up signal for some reason, or the like.

In some examples, the light characteristic of the light band represents at least one of the following: a color and/or brightness of the light emitted by the light band, a position of a light focus of the light distribution provided by the light band, and/or a temporal change, in particular a temporal animation, of a light focus of the light distribution provided by the light band. Although the light band allows in principle only a one-dimensional display, these different light characteristics also provide a plurality of possibilities for providing and communicating respectively different states of the voice assistance system to a user. For example, the pausing state can be visualized by simply not emitting any light from the light band, or by emitting a constant light distribution over the entire band with a very low average intensity or brightness. The listening state, on the other hand, can be indicated by a light distribution with a significantly higher, especially medium or maximum, light intensity. Optionally, the light color can also be changed. In this case, it is particularly advantageous if the light band provides an inhomogeneous light distribution with a maximum in the light focus and a light intensity that decreases on both sides of the maximum.

By changing the light distribution and increasing the brightness during the transition from the pausing state to the listening state, the user's attention can be additionally aroused, namely by changing such light characteristics. The awakening from the pausing state may optionally be accompanied by the output of an acoustic signal to the user, e.g., a beep or a tone, which further indicates to the user that the voice assistance system is ready. A temporal change in, for example, light distributions or intensities is particularly easy for the eye to perceive. Accordingly, it is also advantageous if, for example, one of the states is also visualized by a temporal and/or spatial change of a light focus of the light distribution provided by the light band, for example in the form of a light animation. For example, if the voice assistance system is in a processing state, this can be visualized by a back-and-forth oscillation of the light focus around a defined center point. Even if the user is not looking directly at the light band, he can still perceive the peripheral pendulum movement and, while still concentrating on the traffic, be informed that the voice assistance system is still in the processing state.

In some examples, the light characteristic may additionally be selected depending on a position of a user from whom a voice input has been received by the voice assistance system, in particular depending on whether the user is located in a driver's seat or a front passenger's seat. For example, the light focus can be selected closer to the driver's seat when a voice input is received from the driver of the motor vehicle, and closer to the front passenger's seat when a voice input is received from a front passenger. Advantageously, this also makes it possible to provide feedback as to which vehicle occupant the voice assistance system has received the voice input from. Feedback can then also be provided to the very person who is currently using the voice assistance function.

In a further advantageous embodiment of the invention, the feedback representation displayed on the display device is a representation of one or more superimposed waves. Accordingly, such a wave representation is at least two-dimensional and, assuming at least a three-dimensional display, can also be provided by a three-dimensional display. Such a wave representation can also be displayed in a compact manner and thus does not require a particularly large amount of display space. Furthermore, at least one wave parameter, for example an amplitude and/or frequency and/or phase, can be assigned to the one or more waves, the wave parameter being selected depending on the specific state and the representation being displayed according to the selected wave parameter. In the pausing state, the feedback representation may be omitted entirely. In the listening state, the one or more waves may be represented with a first amplitude or only as a line and, for example, in the processing and/or speaking state, with a different, larger amplitude. It may be advantageous, for example, to represent the speaking state as a maximum of one or a half period length of an in-phase superposition of a plurality of waves of different amplitudes, for example also with a changing amplitude of the envelope.

This wave representation can be used for simulation in some examples, which facilitates and improves the recognition of this state by the user. If voice input is currently received from the user in the processing state or in one of the processed states, it can be visualized by a wave representation as a feedback representation consisting of a plurality of waves of different amplitude, frequency, and phase. In this way, the feedback representation can simulate a frequency representation of the detected voice input, which can also plausibly convey to the user that his voice input is being accurately detected by the system while he is speaking. It would also be conceivable to adjust the amplitude of the wave representation depending on the current volume of the detected voice input. Such a feedback reaction of the voice assistance system to the voice input makes the correct recognition of the voice input even more comprehensible. Such a wave representation can therefore have not only one, but possibly a plurality of wave parameters. Furthermore, such a wave representation can also be varied with respect to its color or position. Also, different animations of such a wave representation depending on the current state are conceivable, e.g., the execution of a pendulum movement around a defined center point, similarly as already described for the light band or also identically and, e.g., synchronously to the light band and/or its animated light characteristic. Such a wave representation thus offers numerous possibilities to convey different states of the voice assistance system to the user in a particularly detailed and differentiated manner.

In some examples, the display device on which the feedback representation is output is selected depending on a position of the user from whom a voice input has been received by the voice assistance system, in particular depending on whether the user is located in a driver's seat or a front passenger's seat. If, for example, a front passenger has made a voice input to the voice assistance system, it is less preferred that the feedback representation be made on a display device assigned to the driver, such as a display in the instrument cluster or in the head-up display. Rather, in this case, it is preferred that the feedback representation then be shown on the center display and/or on a display assigned to the front passenger, if available. On the other hand, if the driver has made a voice input, the feedback representation can also be made on the center display and/or on a display assigned to the driver, such as the above-mentioned display in the instrument cluster or a head-up display. Thus, advantageously, the other user is not distracted when the feedback representation is output on a display device associated with the user who is currently using the voice assistance function, and/or the information output can be very easily grasped by the respective user, in particular by the driver, which in turn does not distract him from the traffic situation.

FIG. 1 is a schematic representation of a motor vehicle 10 with a voice assistance system 12 according to some aspects of the present disclosure. In this example, the voice assistance system 12 is configured to perform a voice assistance function, e.g., to perform various tasks depending on a received voice input from a user. However, the tasks to be performed by such an assistance function are not of particular relevance to the present invention. When such a voice assistance system 12 communicates with a user, the voice assistance system 12 may be in different states Z1, Z2, Z3, Z4, Z5 during such communication. These states Z1 through Z5 may represent, for example, a pausing state currently represented by a first state Z1; a listening state Z2 in which the voice assistance system 12 is prepared to receive voice input from a user; a first processing state Z3 in which the voice assistance system 12 receives voice input from the user; a second processing state Z4 in which the voice assistance system 12 performs a task specified by the voice input; and a speaking state Z5 in which the voice assistance system 12 outputs information to the user. For example, such a voice assistance system 12 may be transitioned from the pausing state Z1 to the active listening state Z2 by speaking the specific keyword. In the present case, these states Z1 to Z5 are illustrated in FIG. 1 by a state module 14 of a control device 16 of the voice assistance system 12.

Many of these states would be indistinguishable to a user without appropriate feedback, and the current processing steps of the system would be incomprehensible to a user. Whether such a voice assistance system has now successfully transitioned to the listening state, whether a voice input has been correctly received, or whether the voice assistance system has now shut down for some reason without performing the desired output, is not apparent to a user without appropriate feedback. The following embodiments of the invention show how such feedback can be provided in a particularly advantageous, differentiated and, above all, particularly less distracting manner for a driver, so that a user of a motor vehicle 10 can be informed about the respective states Z1 to Z5 of the voice assistance system in a particularly situation-adapted manner.

For this purpose, the motor vehicle 10 has, on the one hand, a light band 18 in which a so-called ID light can be provided. This light band 18 can, for example, be configured as one or two or three LED rows, which make it possible to provide a specific light distribution along this light band 18. Furthermore, the motor vehicle 10 comprises at least one display device 20, such as a center display 20. The control device 16 of the voice assistance system 12 is now advantageously designed to assign a respective state Z1 to Z5 to one of a plurality of feedback representations D1, D2, D3, D4, D5, on the one hand, and to one of a plurality of defined light characteristics L1, L2, L3 of the light band 18, on the other hand. Depending on the current state Z1 to Z5 of the voice assistance system 12, this state is thus assigned exactly one feedback representation D1 to D5, on the one hand, and only one light characteristic L1 to L3, on the other hand.

Furthermore, the assigned feedback representation D1 to D5 may be displayed on the display device 20 and, at the same time, a light distribution according to the light characteristic L1 to L3 is output or provided by the light band 18. Even a completely inactive state of the light band 18 can be defined as such a light characteristic. The different light characteristics L1, L2, L3 are exemplarily shown in FIG. 1 in a light characteristic module 22 of the control device 16 and the different feedback representations in a representation module 24 of the control device 16. By combining both the light characteristics L1 to L3 of the light band 18 and the feedback representations D1 to D5 for display on the display device 20, the various states Z1 to Z5 of the voice assistance system can be represented in a particularly differentiated manner and in a manner which is particularly easy and intuitive for the user to perceive. The risk of operating errors and incorrect entries as well as user frustration can thus be avoided. Most importantly, it allows for faster operation, so that distraction from the traffic can be kept to a minimum, especially for a driver as a user. Some advantageous visualization options as feedback for the respective states Z1 to Z5 will be explained in more detail below in connection with FIG. 2 to FIG. 6.

Figure 2:
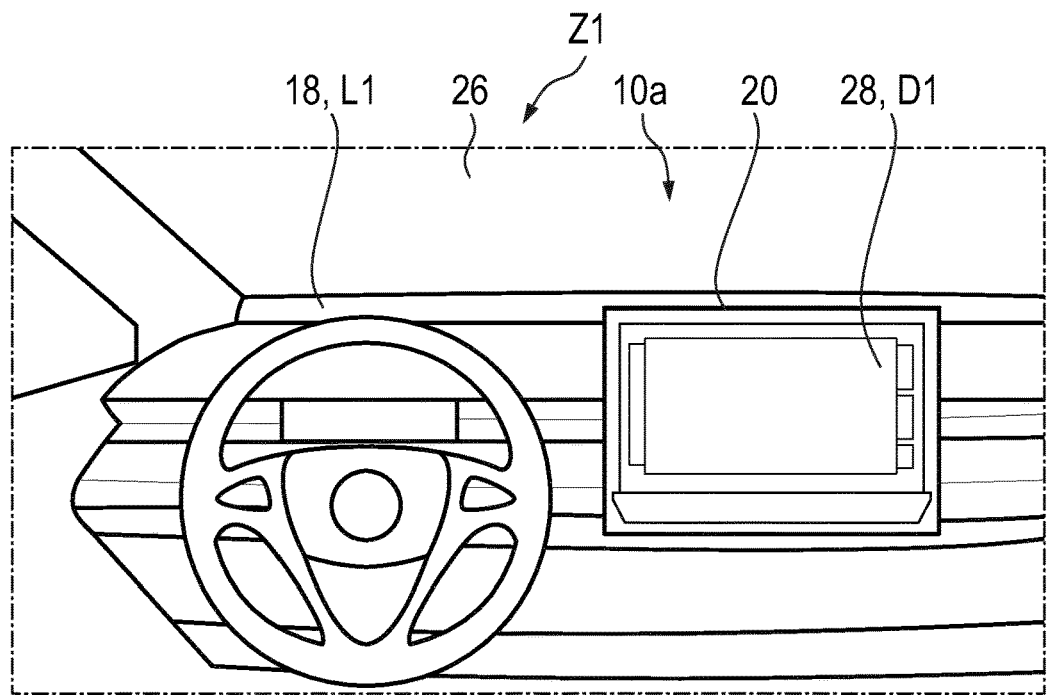
FIG. 2 illustrates a schematic representation of the voice assistance system in a pausing state according to some aspects of the present disclosure.
Figure 3:
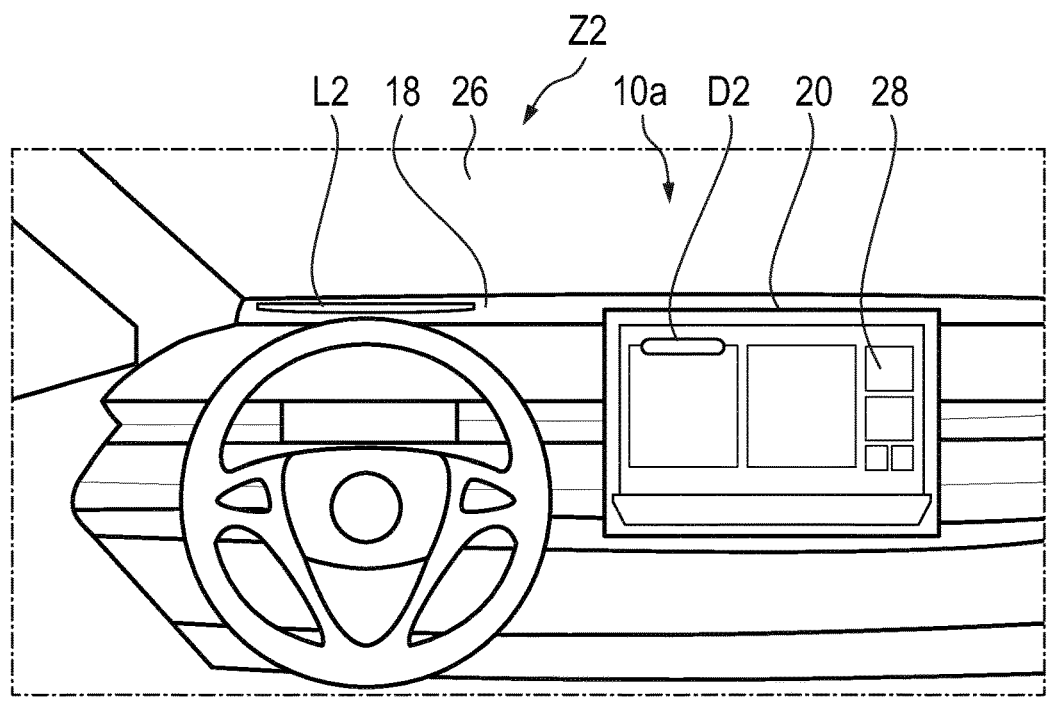
FIG. 3 illustrates a schematic representation of the visualization of a second state of the voice assistance system according to some aspects of the present disclosure.

FIG. 2 is a schematic representation of a part of an interior 10a of the motor vehicle 10, in which, on the one hand, the light band 18, which in the present example is in the inactive state, is arranged, in particular at a lower end of the windshield 26 of the motor vehicle, and, on the other hand, a display device designed as a center display 20 is arranged. A specific representation 28, e.g., a navigation representation, may currently be displayed on the display device 20. In the example shown in FIG. 2, the voice assistance system 12 is in a pausing state Z1, which may also be referred to as "pause." In this state Z1, the light band 18 is not illuminated. The non-illumination of the light band 18 can thus be understood as a first light characteristic L1. No representation appears on the display device 20 as a first feedback representation D1 assigned to this pausing state Z1. In the pausing state Z1, the voice assistance system 12 is in a "sleep" or idle mode, so to speak, in which no voice commands can be received or processed by the voice assistance system 12. The voice assistance system 12 can, for example, be awakened from this sleep mode Z1 by a keyword. If this is the case, the voice assistance system 12 enters a listening state, which may also be referred to as "listening" and which is illustrated in FIG. 3.

Figure 4:
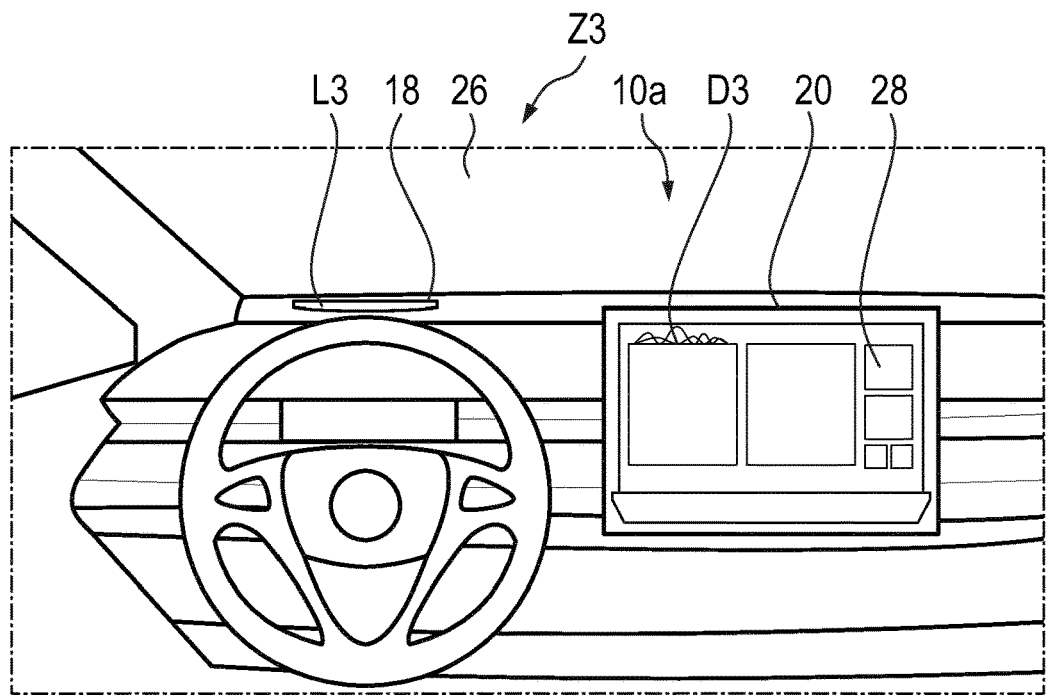
FIG. 4 illustrates a schematic representation of a visualization of a third state of the voice assistance system according to some aspects of the present disclosure.

This listening state is designated Z2 in the figure. In this second state Z2, the light band 18 now illuminates according to a first light characteristic L2, in that, on the one hand, the light focus of the light distribution is located in the vicinity of the speaking driver, from whom, for example, the wake-up signal has been received. In addition, the readiness of the voice assistance system 12 is now visualized by a corresponding representation D2 on the display device 20. This visualization D2 can also be in the form of a narrow strip of light. Preferably, the feedback representations D1 to D5 are formed as wave representations, in particular as wave representations parameterized with at least one parameter. In this example, this second feedback representation D2 would simply be a flat line, i.e., a wave with an amplitude of zero. If a voice command is now issued by the driver to the voice assistance system 12 and received by the voice assistance system, this can also be visualized both by a corresponding light characteristic L3 of the light band 18 and by a corresponding feedback representation D3 on the display device 20, as shown in FIG. 4. The example of FIG. 4 illustrates a first processing state Z3 of the voice assistance system 12, in which a voice input from the user is currently being received. In this example, this is accompanied by a feedback representation D3 on the display device 20, which includes a superimposition, such as a phase-shifted superimposition, of different waves. This visualizes to the driver or front passenger, or to the user in general, that his or her current voice input is about to be received by the voice assistance system 12. The user thus receives feedback that the voice assistance system 12 is operating correctly. In this example, the light band 18 continues to direct its light focus toward the person speaking, in this example the driver, which is expressed by the third light characteristic L3.

Figure 5:
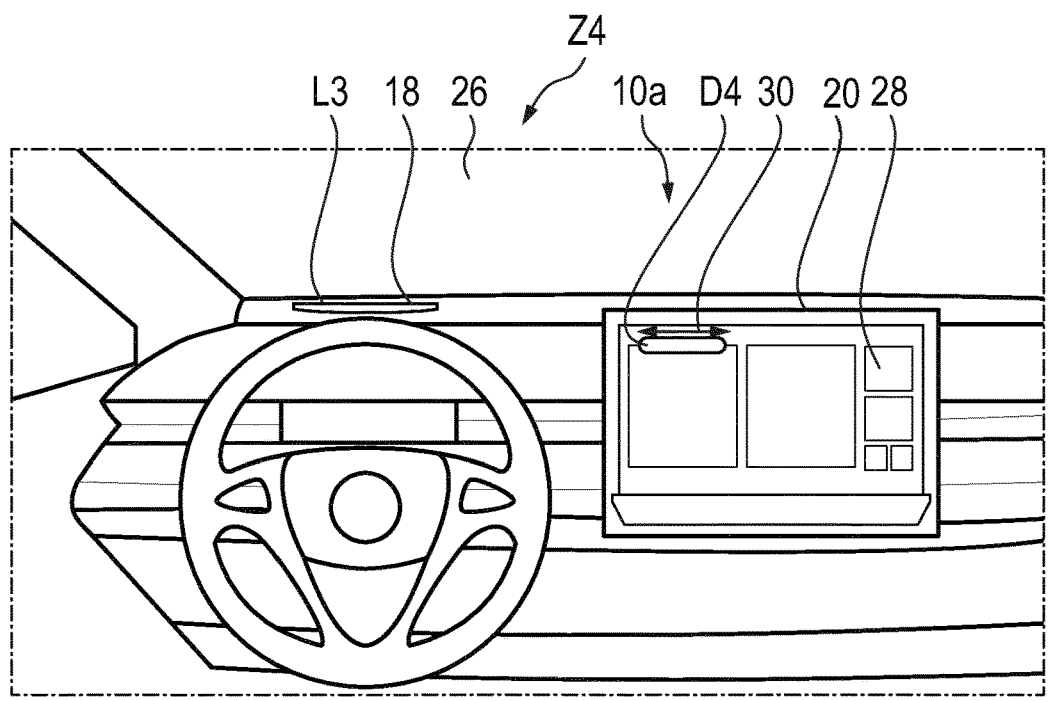
FIG. 5 illustrates a schematic representation of a visualization of a fourth state of the voice assistance system according to some aspects of the present disclosure.

FIG. 5 illustrates a further fourth state Z4, which represents a second processing state Z4. In this state Z4, which may also be referred to as "processing," the voice assistance system 12 performs processing steps to accomplish the task specified by the voice input. For example, it searches for gas stations or restaurants along the route or nearby. This processing state Z4 can in turn be illustrated to a user by a corresponding light characteristic L3 of the light band 18 in combination with a corresponding feedback representation D4 on the display device 20. In this example, the light characteristic L3 does not differ from that of the third state Z3 of FIG. 4, but the corresponding feedback representations D3, D4 on the display device 20 do differ. For example, this fourth feedback representation D4 may be provided by again displaying an illuminated strip on the display device 20, but which may vary in time. This temporal movement is illustrated by the double arrow 30. Here, for example, the light focus of this strip or of the strips as a whole may be shifted to the left and/or to the right, for example periodically and repeatedly, although the strip length may also change under certain circumstances. Such a movement 30 illustrates the processing state Z4 of the voice assistance system 12 to the user. The fact that the voice assistance system is still active is simultaneously illustrated to the user by the corresponding light indicator L3 of the light band 18.

Figure 6:
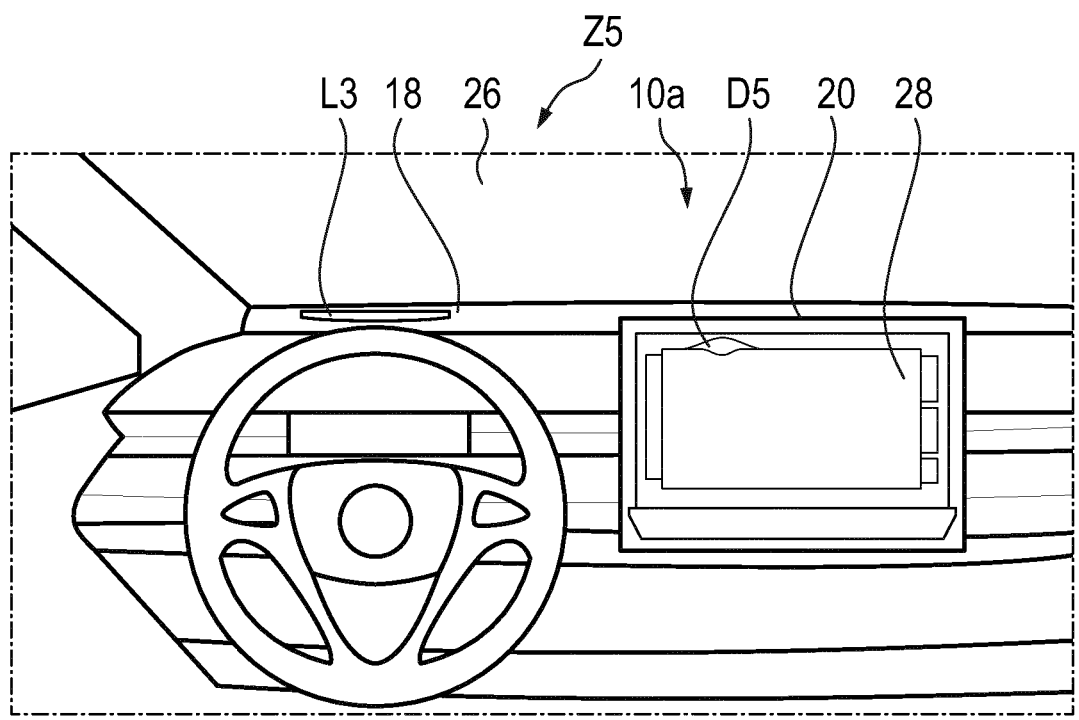
FIG. 6 illustrates a schematic representation of a visualization of a fifth state of the voice assistance system according to some aspects of the present disclosure.

FIG. 6 illustrates a further fifth state Z5 of the voice assistance system 12, which can also be designated as speaking, in which information is finally output to the user by the voice assistance system 12, for example, as voice output. This can be additionally illustrated to the user by a corresponding light characteristic L3 of the light band 18 in combination with a corresponding feedback representation D5 on the display device 20, which in this example has the form of a fanned-out wave, for example similar to a speaking mouth.

If, for example, the voice assistance system 12 subsequently returns to the pausing state, for example if no further voice input is received from the user for a longer period of time, or if a task is completed, the visualization can also return to the state shown with respect to FIG. 2.

Such a light band 18 thus provides an ID light in a certain way, if at the same time an even more differentiated state visualization is made possible by a wave representation on a display device.

The examples provided herein show how an IDA visualization may be provided using wave representation and ID light, in particular across touch points, which allows the user to be provided with an easily understandable and uniform visualization of the voice assistant from the periphery, so that the individual states of the assistant are clearly recognizable for use. The voice assistant communicates with the user in different states, such as Listening, Speaking, Processing, Pause, and distinguishes between the driver's side and the front passenger's side. Each state is represented by an appropriate wave representation, e.g., in the center display, and an appropriate line animation in the ID light. This provides a wave representation with a matching line animation in the ID light.

LIST OF REFERENCE SIGNS

10 Motor vehicle
10*a* Interior
12 Voice assistance system
14 State module
16 Control device
18 Light band
20 Display device
22 Light characteristic module
24 Representation module
26 Windshield
28 Representation
30 Movement
L1 Light characteristic
L2 Light characteristic
L3 Light characteristic
D1 Feedback representation
D2 Feedback representation
D3 Feedback representation
D4 Feedback representation
D5 Feedback representation
Z1 Pausing state
Z2 Listening state
Z3 First processing state
Z4 Second processing state
Z5 Speaking state

The invention claimed is:
1. A method for displaying a specific state of a voice assistance system for performing a voice assistance function for a motor vehicle, comprising:
providing a specified light distribution along a light band, wherein a specific light characteristic of the light band is assigned to a specific state of the voice assistance system;
displaying, via the light band, the specified light distribution according to the associated light characteristic when the voice assistance system is in the specific state;

assigning a specific feedback representation to the specific state of the voice assistance system; and displaying the specific feedback representation on the display device instead of the light band when the voice assistance system is in the specific state.

2. The method according to claim 1, wherein the voice assistance system has a plurality of different states including the specific state, each of the different states being assigned a respective light characteristic of the light band and a specific feedback representation, so that two different states are not assigned both the same light characteristic and the same specific feedback representation.

3. The method according to claim 1, wherein the specific state represents one of the following states assigned to the voice assistance system:
   a listening state in which the voice assistance system is prepared to receive a voice input from a user;
   a processing state in which the voice assistance system receives a voice input and/or processes a received voice input and/or performs a task specified by the voice input;
   a speaking state in which the voice assistance system outputs information to a user; and
   a pausing state in which the voice assistance system is prepared to receive a defined wake-up signal but not to receive a voice input other than the wake-up signal.

4. The method according to claim 1, wherein the light characteristic of the light band represents at least one of the following:
   a color and/or brightness;
   a position of a light focus of the light distribution provided by the light band;
   a temporal animation of a light focus of the light distribution provided by the light band.

5. The method according to claim 1, wherein the light characteristic is additionally specified depending on a position of a user from whom a voice input has been received by the voice assistance system, depending on whether the user is located in a driver's seat or in a front passenger's seat.

6. The method according to claim 1, wherein the feedback representation comprises a representation of one or more superimposed waves, the one or more superimposed waves being assigned a wave parameter depending on the specific state and the feedback representation being represented according to the selected wave parameter.

7. The method according to claim 6, wherein the wave parameter comprises a wave amplitude.

8. The method according to claim 1, wherein the display device on which the feedback representation is output is selected depending on a position of a user from whom a voice input has been received by the voice assistance system, depending on whether the user is located in a driver's seat or in a front passenger's seat.

9. The method according to claim 1, wherein the display device comprises one or more of (i) a center display of the motor vehicle, (ii) a display in an instrument cluster of the motor vehicle, and/or (iii) a head-up display.

10. A voice assistance system, comprising:
    a display device;
    a light band; and
    a control device, operatively coupled to the light band and the display device, the control device being configured to
        provide a specified light distribution along the light band, wherein a specific light characteristic of the light band is assigned to a specific state of the voice assistance system;
        display, via the light band, the specified light distribution according to the associated light characteristic when the voice assistance system is in the specific state;
        assign a specific feedback representation to the specific state of the voice assistance system; and
        display the specific feedback representation on the display device instead of the light band when the voice assistance system is in the specific state.

11. The voice assistance system according to claim 10, wherein the control device is designed to configure a plurality of different states including the specific state, each of the different states being assigned a respective light characteristic of the light band and a specific feedback representation, so that two different states are not assigned both the same light characteristic and the same specific feedback representation.

12. The voice assistance system according to claim 10, wherein the specific state represents one of the following states assigned to the voice assistance system:
    a listening state in which the voice assistance system is prepared to receive a voice input from a user;
    a processing state in which the voice assistance system receives a voice input and/or processes a received voice input and/or performs a task specified by the voice input;
    a speaking state in which the voice assistance system outputs information to a user; and
    a pausing state in which the voice assistance system is prepared to receive a defined wake-up signal but not to receive a voice input other than the wake-up signal.

13. The voice assistance system according to claim 10, wherein the light characteristic of the light band represents at least one of the following:
    a color and/or brightness;
    a position of a light focus of the light distribution provided by the light band;
    a temporal animation of a light focus of the light distribution provided by the light band.

14. The voice assistance system according to claim 10, wherein the control device is configured to additionally specify light characteristic depending on a position of a user from whom a voice input has been received by the voice assistance system, depending on whether the user is located in a driver's seat or in a front passenger's seat.

15. The voice assistance system according to claim 10, wherein the feedback representation comprises a representation of one or more superimposed waves, the one or more superimposed waves being assigned a wave parameter depending on the specific state and the feedback representation being represented according to the selected wave parameter.

16. The voice assistance system according to claim 15, wherein the wave parameter comprises a wave amplitude.

17. The voice assistance system according to claim 10, wherein the display device on which the feedback representation is output is selected by the control device depending on a position of a user from whom a voice input has been received by the voice assistance system, depending on whether the user is located in a driver's seat or in a front passenger's seat.

18. The voice assistance system according to claim 10, wherein the display device comprises one or more of (i) a center display of the motor vehicle, (ii) a display in an instrument cluster of the motor vehicle, and/or (iii) a head-up display.

19. A vehicle, comprising:
a voice assistance system, the voice assistance system comprising
a display device;
a light band; and
a control device, operatively coupled to the light band and the display device, the control device being configured to
provide a specified light distribution along the light band, wherein a specific light characteristic of the light band is assigned to a specific state of the voice assistance system;
display, via the light band, the specified light distribution according to the associated light characteristic when the voice assistance system is in the specific state;
assign a specific feedback representation to the specific state of the voice assistance system; and
display the specific feedback representation on the display device instead of the light band when the voice assistance system is in the specific state.

20. The vehicle according to claim 19, wherein the control device is designed to configure a plurality of different states including the specific state, each of the different states being assigned a respective light characteristic of the light band and a specific feedback representation, so that two different states are not assigned both the same light characteristic and the same specific feedback representation.

* * * * *